United States Patent
Kim

(10) Patent No.: US 10,773,584 B2
(45) Date of Patent: Sep. 15, 2020

(54) ENGINE MOUNT FOR VEHICLE

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 16/168,651

(22) Filed: Oct. 23, 2018

(65) Prior Publication Data
US 2020/0001695 A1 Jan. 2, 2020

(30) Foreign Application Priority Data
Jun. 29, 2018 (KR) .......................... 10-2018-0075179

(51) Int. Cl.
*B60K 5/12* (2006.01)
*F16F 13/18* (2006.01)
*F16F 13/14* (2006.01)

(52) U.S. Cl.
CPC .......... *B60K 5/1208* (2013.01); *B60K 5/1266* (2013.01); *F16F 13/1427* (2013.01); *F16F 13/1463* (2013.01); *F16F 13/1481* (2013.01); *F16F 13/18* (2013.01)

(58) Field of Classification Search
CPC ............... F16F 13/1427; F16F 13/1463; F16F 13/1481; F16F 13/18; B60K 5/1208; B60K 5/1266
See application file for complete search history.

(56) References Cited

U.S. PATENT DOCUMENTS

| | | | | |
|---|---|---|---|---|
| 6,131,893 A | * | 10/2000 | Seynaeve | F16F 13/10 267/140.11 |
| 2008/0262672 A1 | * | 10/2008 | Ohta | G01M 7/025 701/31.4 |
| 2014/0246558 A1 | * | 9/2014 | Ichikawa | F16F 13/1409 248/634 |
| 2015/0252866 A1 | * | 9/2015 | Muraoka | F16F 13/103 267/140.13 |
| 2017/0335920 A1 | * | 11/2017 | Kanaya | B60K 5/1208 |
| 2019/0160933 A1 | * | 5/2019 | Kim | F16F 13/16 |

FOREIGN PATENT DOCUMENTS

JP         JP-4113889 B2 *  7/2008   .............. F16F 13/10

* cited by examiner

*Primary Examiner* — Melanie Torres Williams
(74) *Attorney, Agent, or Firm* — Morgan, Lewis & Bockius LLP

(57) ABSTRACT

An engine mount for a vehicle may include a support bracket including a mounting hole formed in one end portion thereof, an engine-mounting plate provided at an opposite end portion thereof to be connected to an engine, and a coupling portion protruding from an external surface of the one end portion thereof; a fluid-filled assembly including a hook cup configured to be inserted into the mounting hole in the support bracket; and a rubber assembly configured to be mounted to a vehicle body, wherein, in a state in which the fluid-filled assembly is inserted into the mounting hole in the support bracket, the fluid-filled assembly is stacked on a top surface of the rubber assembly, and a housing of the rubber assembly is coupled to the coupling portion of the support bracket.

11 Claims, 15 Drawing Sheets

DRAFT ANGLE 0.5°

→ : FORCE TRANSMISSION DIRECTION

→ : BSR NOISE ISOLATION DIRECTION

ENGINE MOUNT FOR VEHICLE

CROSS-REFERENCE TO RELATED APPLICATION

The present application claims priority to Korean Patent Application No. 10-2018-0075179 filed on Jun. 29, 2018, the entire contents of which is incorporated herein for all purposes by this reference.

BACKGROUND OF THE INVENTION

Field of the Invention

The present invention relates to an engine mount for a vehicle. More particularly, it relates to an inverse-type engine mount for a vehicle in which a fluid-filled assembly and a rubber assembly are separably coupled to each other and in which a support bracket, which is to be connected to an engine, is directly and integrally assembled with the fluid-filled assembly.

Description of Related Art

In general, when a powertrain including an engine and a transmission is disposed in the engine compartment of a vehicle, an engine mount for controlling vibration is provided at the position at which the engine is disposed and supported.

Typically, an engine mount is mounted to a side member of a vehicle body, and a support bracket is located between the top surface of the engine mount and the engine to connect the engine mount to the engine.

However, in many cases, combustion noise of the engine is transferred to the internal of the vehicle via the support bracket. For the present reason, as shown in FIG. 1, a support bracket 20, which is disposed to the top surface of an engine mount 10, is provided with a mass damper 22 to attenuate vibration and noise.

The support bracket, which interconnects the engine mount and the engine, is in a form of a cantilever, and thus suffers from poor dynamic stiffness. To increase the dynamic stiffness of the support bracket, the mass damper is provided at the support bracket.

However, installation of the mass damper, which weighs about 2.6 kg, to the support bracket increases the weight of the vehicle.

To prevent the present problem, an inverse-type engine mount is utilized.

The inverse-type engine mount is configured such that a fluid-filled assembly is located at the upper side and a rubber assembly is located at the lower side by turning over the above-described engine mount.

However, because the fluid-filled assembly and the rubber assembly are formed in a single body, the inverse-type engine mount of the related art has shortcomings in that it cannot be tuned.

Furthermore, to connect the inverse-type engine mount of the related art to an engine, a separate mounting bracket is disposed to or is integrally formed with a housing portion of the rubber assembly of the inverse-type engine mount. Subsequently, the present mounting bracket needs to be connected to a support bracket connected to the engine. In the present manner, an additional constituent element, i.e. the mounting bracket, is required.

In addition, to directly connect the support bracket to the housing portion of the rubber assembly, the housing portion needs to be increased in height and size, and thus the connecting structure of the support bracket becomes complicated.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an inverse-type engine mount for a vehicle in which a fluid-filled assembly and a rubber assembly are coupled to each other to be separable from each other in a vertical direction and in which a support bracket, which is to be connected to an engine, is directly and integrally assembled with the fluid-filled assembly, simplifying the connection structure between the engine mount and the engine and making it easy to tune the engine mount or to perform maintenance thereof.

Various aspects of the present invention are directed to providing an engine mount for a vehicle including a support bracket including a mounting hole formed in one end portion thereof, an engine-mounting plate provided at the opposite end portion thereof to be connected to an engine, and a coupling portion protruding from the external surface of the one end portion thereof, a fluid-filled assembly including a hook cup configured to be inserted into the mounting hole in the support bracket, and a rubber assembly configured to be mounted to a vehicle body, wherein, in the state in which the fluid-filled assembly is inserted into the mounting hole in the support bracket, the fluid-filled assembly is stacked on the top surface of the rubber assembly, and a housing of the rubber assembly is coupled to the coupling portion of the support bracket.

In an exemplary embodiment of the present invention, the support bracket may include a locking recess formed in the lower end portion of the mounting hole along the internal circumferential surface of the mounting hole, and the hook cup may include a plurality of external hooks integrally formed at the lower end portion thereof to be fitted into the locking recess.

In another exemplary embodiment of the present invention, the mounting hole may be formed to have a draft angle which is oriented in a downward direction thereof In yet another exemplary embodiment of the present invention, the rubber assembly may include a housing having an open top portion, the housing being connected to the vehicle body, a first core including a core bolt, and a first main rubber formed at the bottom surface of the housing through a curing process to surround the first core.

In yet another exemplary embodiment of the present invention, the core bolt may protrude from the bottom surface of the housing and may be fastened to a vehicle body mounting bracket.

In still yet another exemplary embodiment of the present invention, the housing may include a coupling rod integrally formed at the external circumferential surface thereof to be coupled with the coupling portion of the support bracket using a bolt.

In a further exemplary embodiment of the present invention, the hook cup may be stacked on the open top portion of the housing of the rubber assembly to communicate therewith, and the fluid-filled assembly may further include a diaphragm disposed at the upper end portion position inside the hook cup to maintain sealing contact with the hook cup with respect to upward flow of the fluid, an orifice member disposed under the diaphragm, the orifice member including a fluid flow passage formed therein to ensure flow of the fluid in a vertical direction thereof, a membrane disposed in a hollow portion formed in the middle of the orifice member to separate an upper fluid chamber and a lower fluid chamber, and a second main rubber disposed such that the circumference of the top surface thereof comes into contact with and is supported by the circumference of the bottom surface of the orifice member, such that the external circumferential surface thereof maintains sealing contact with the internal circumferential surface of the hook cup with respect to downward flow of the fluid, and such that the bottom surface thereof comes into close contact with the top surface of a first main rubber of the rubber assembly.

In another further exemplary embodiment of the present invention, the hook cup may include a plurality of internal hooks integrally formed at the internal surface of the lower end portion thereof, the internal hooks being configured to allow the circumference of the bottom surface of the second main rubber to be locked by the internal hooks.

In yet another further exemplary embodiment of the present invention, the fluid-filled assembly may further include a second core provided inside the second main rubber along the circumference of the second main rubber, the second core including a lower end portion exposed through the bottom surface of the second main rubber to be locked by the internal hooks.

In yet another further exemplary embodiment of the present invention, the fluid-filled assembly may further include an auxiliary core provided inside the second main rubber, the auxiliary core including a center-aligning protrusion formed at the center of the bottom surface thereof to be inserted into a center-aligning recess formed in the first main rubber.

In still yet another further exemplary embodiment of the present invention, the hook cup may include a plurality of support legs integrally formed at the lower end portion thereof, and each of the external hooks and each of the internal hooks may share a corresponding one of the support legs to integrally protrude from the external surface and the internal surface of the corresponding one of the support legs, respectively.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the present invention are discussed infra.

Figure 1:
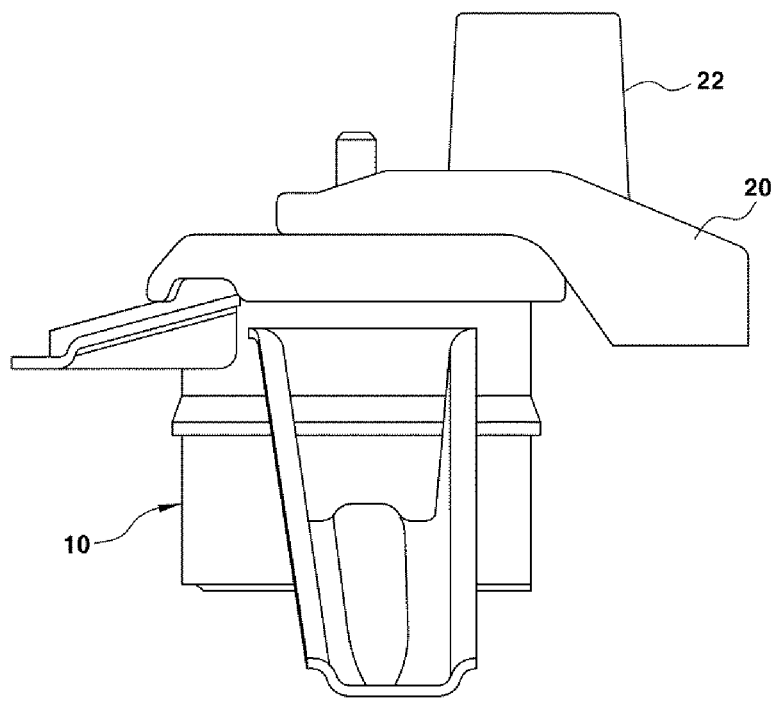
FIG. 1 is a front view illustrating an engine mount of the related art.
Figure 2A:
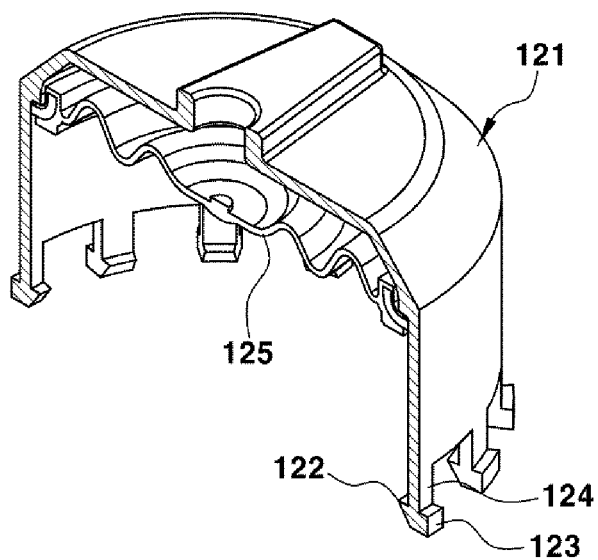
FIG. 2A, FIG. 2B, FIG. 2C, FIG. 2D, FIG. 2E, and FIG. 2F are perspective views illustrating a fluid-filled assembly of an engine mount for a vehicle according to an exemplary embodiment of the present invention and an assembly process thereof.
Figure 2B:
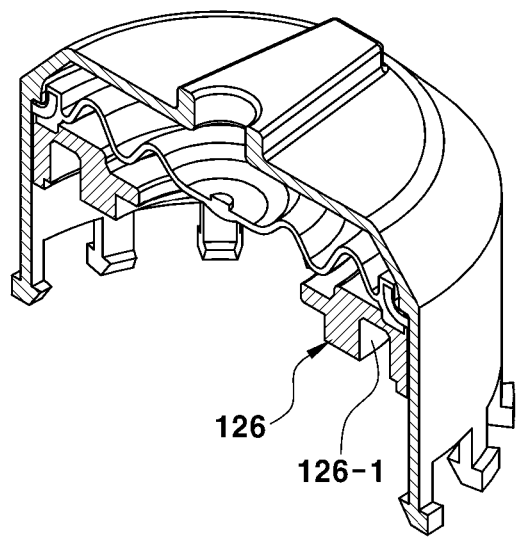
Figure 2C:
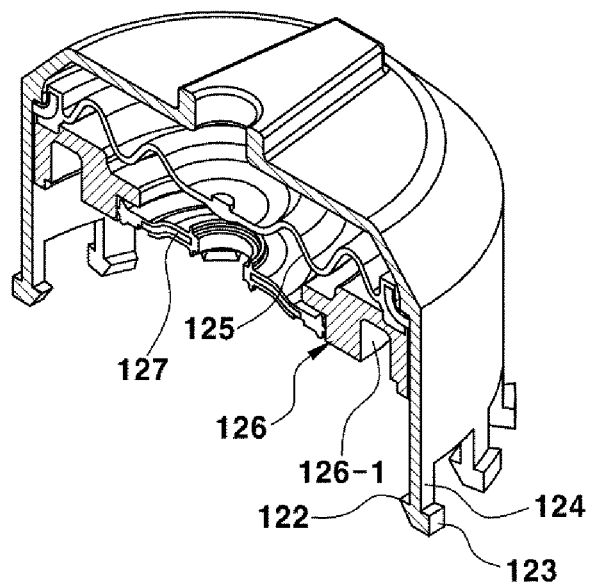
Figure 2D:
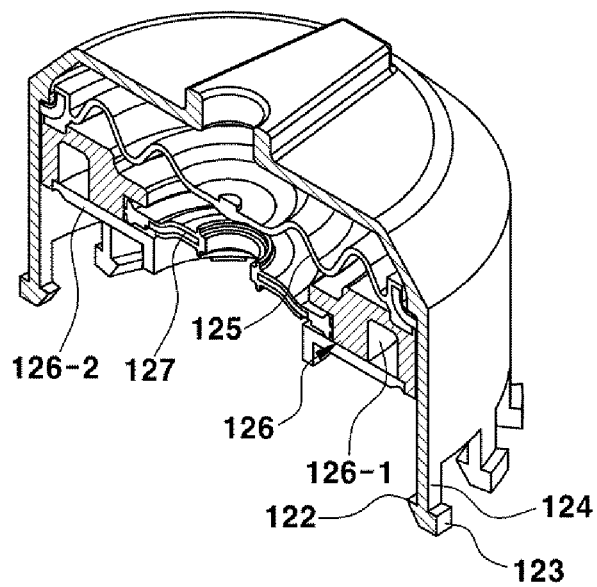
Figure 2E:
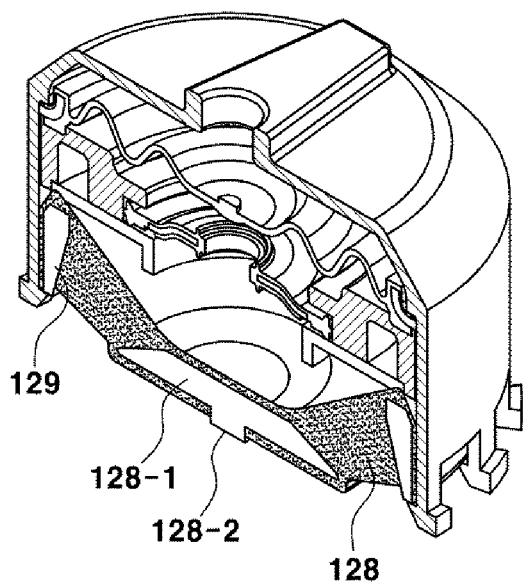
Figure 2F:
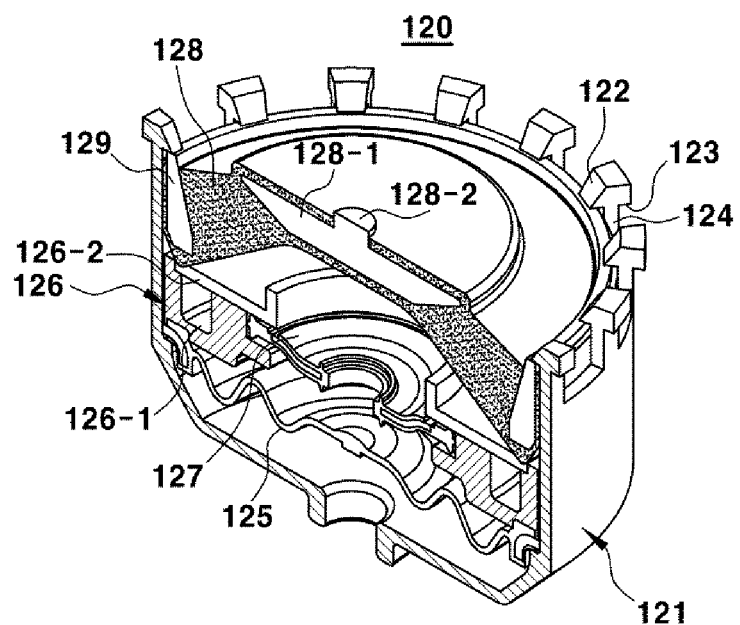
Figure 3A:
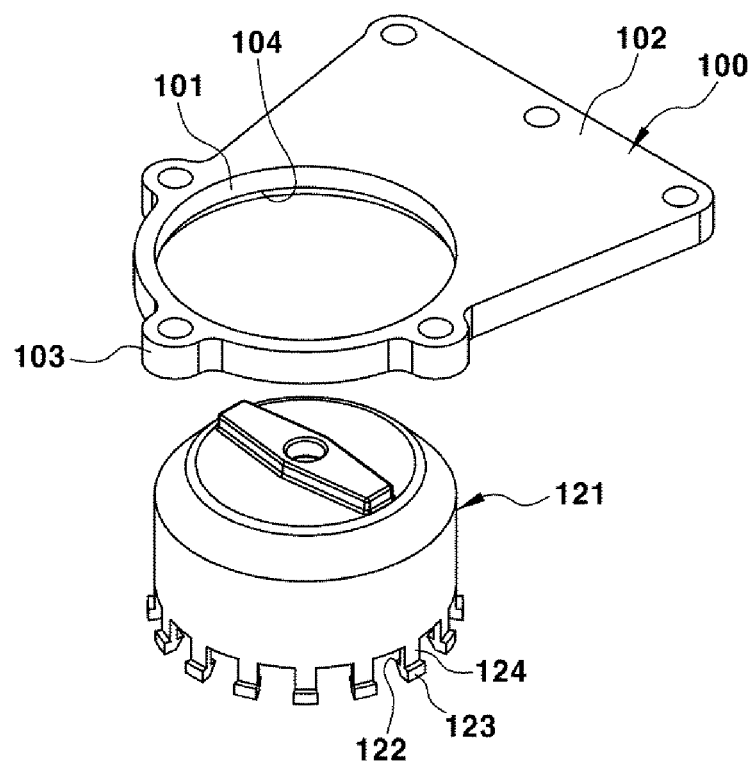
FIG. 3A, FIG. 3B, FIG. 3C, and FIG. 3D are perspective views illustrating a process of mounting a support bracket to the fluid-filled assembly in the engine mount for a vehicle according to an exemplary embodiment of the present invention.
Figure 3B:
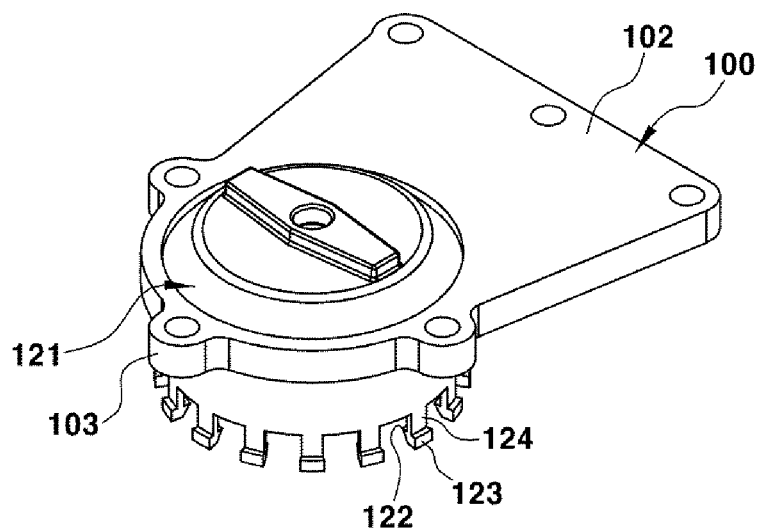
Figure 3C:
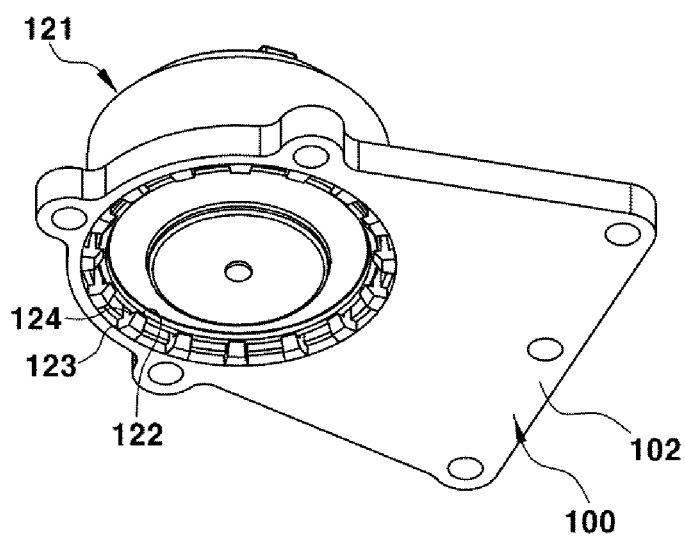
Figure 3D:
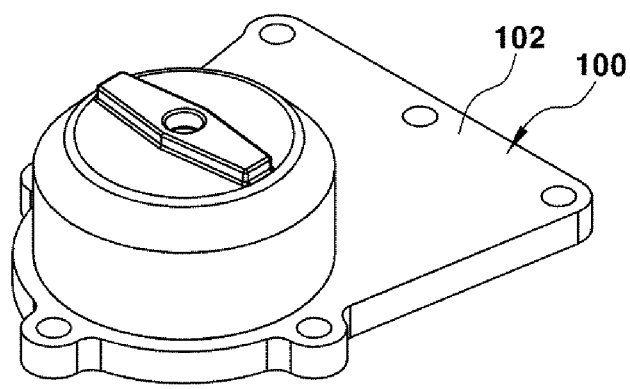
Figure 4A:
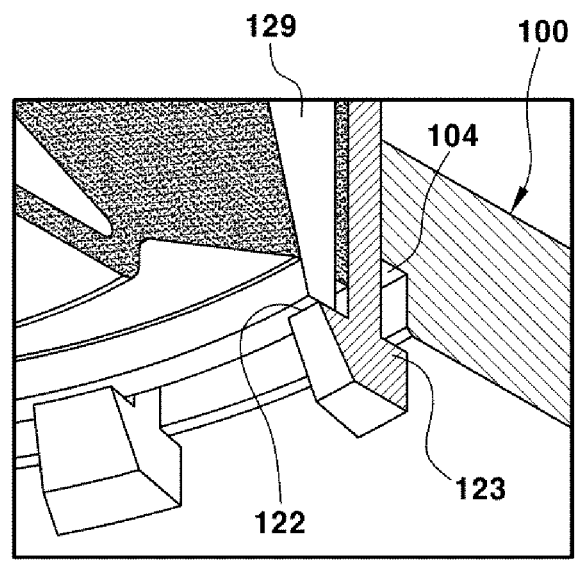
FIG. 4A and FIG. 4B are cross-sectional views of essential parts illustrating the process of mounting the support bracket to the fluid-filled assembly in the engine mount for a vehicle according to an exemplary embodiment of the present invention.
Figure 4B:
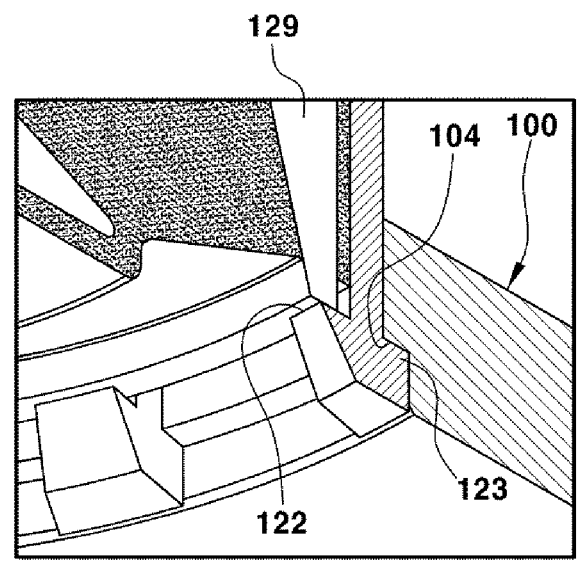

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, reference will now be made in detail to various embodiments of the present invention, examples of which are illustrated in the accompanying drawings and described below.

FIG. 2A, FIG. 2B, FIG. 2C, FIG. 2D, FIG. 2E, and FIG. 2F are perspective views illustrating a fluid-filled assembly of an engine mount for a vehicle according to an exemplary embodiment of the present invention and an assembly process thereof.

The fluid-filled assembly 120 includes a hook cup 121, which is stacked on a housing 112 of a rubber assembly 110 to communicate therewith.

The hook cup 121 is formed to have an open bottom portion, and includes a plurality of internal hooks 122 and a plurality of external hooks 123 integrally formed at the lower end portion thereof.

In more detail, the hook cup 121 includes a plurality of support legs 124 integrally formed at the lower end portion thereof, and each of the internal hooks 122 and each of the external hooks 123 share a corresponding one of the support legs 124 to integrally protrude from the internal surface and the external surface of the corresponding support leg 124, respectively.

Various constituent parts of the fluid-filled assembly are stacked on and assembled with one another inside the hook cup 121 as configured above.

First, a diaphragm 125 is disposed at an upper end portion position inside the hook cup 121 to maintain sealing contact with the hook cup 121 with respect to the upward flow of the fluid.

Subsequently, an orifice member 126, in which a fluid flow passage 126-1 is formed, is provided under the diaphragm 125 to be spaced from therefrom to ensure the flow of the fluid in the vertical direction thereof, i.e. the flow of the fluid between an upper fluid chamber 120-1 and a lower fluid chamber 120-2.

Subsequently, a membrane 127 is disposed in a hollow portion formed in the middle of the orifice member 126 to separate the upper fluid chamber 120-1 and the lower fluid chamber 120-2.

The orifice member 126 further includes an orifice cover 126-2 to seal the fluid flow passage 126-1. The orifice cover 126-2 also is configured to support the membrane 127.

Although not illustrated, the orifice member 126 has therein a hole for communication between the fluid flow passage 126-1 and the upper fluid chamber 120-1, and the orifice cover 126-2 has therein a hole for communication between the fluid flow passage 126-1 and the lower fluid chamber 120-2.

Subsequently, a second main rubber 128 is disposed at the circumference of the bottom surface of the orifice cover 126-2.

In more detail, the circumference of the top surface of the second main rubber 128 comes into contact with and is supported by the circumference of the bottom surface of the orifice cover 126-2. At the same time, the external circumferential surface of the second main rubber 128 maintains sealing contact with the internal circumferential surface of the hook cup 121 with respect to the downward flow of the fluid.

A second core 129 may be provided inside the second main rubber 128 along the circumference of the second main rubber 128. The lower end portion of the second core 129 may be exposed downwards through the bottom surface of the second main rubber 128.

The reason why the lower end portion of the second core 129 is exposed through the bottom surface of the second main rubber 128 is to prevent the elastic second main rubber 128 from coming into contact with the internal hooks 122 of the hook cup 121 and to allow the hard metallic second core 129 to come into contact with and to be locked by the internal hooks 122, as shown in FIG. 2A, FIG. 2B, FIG. 2C, FIG. 2D, FIG. 2E, and FIG. 2F. In the present manner, the constituent parts disposed inside the hook cup 121 are securely assembled with each other by being locked and supported by the internal hooks 122.

The upper fluid chamber 120-1 is defined by the space between the diaphragm 125 and the membrane 127, and the lower fluid chamber 120-2 is defined by the space between the membrane 127 and the second main rubber 128.

A fluid is injected into the upper fluid chamber 120-1 or the lower fluid chamber 120-2 using a dry-filling method.

In more detail, a fluid may be easily injected into the upper fluid chamber 120-1 or the lower fluid chamber 120-2 via the fluid flow passage 126-1 in the orifice member 126 by forming small holes 300 and 310 in the hook cup 121 and the orifice member 126 and injecting a fluid through the holes 300 and 310. Subsequently, the hook cup 121 and the orifice member 126 may be sealed by blocking the small holes 300 and 310 formed therein using steel balls.

Subsequently, a support bracket 100 for connection with an engine is assembled with the fluid-filled assembly 120, which is assembled as described above.

Figure 5:
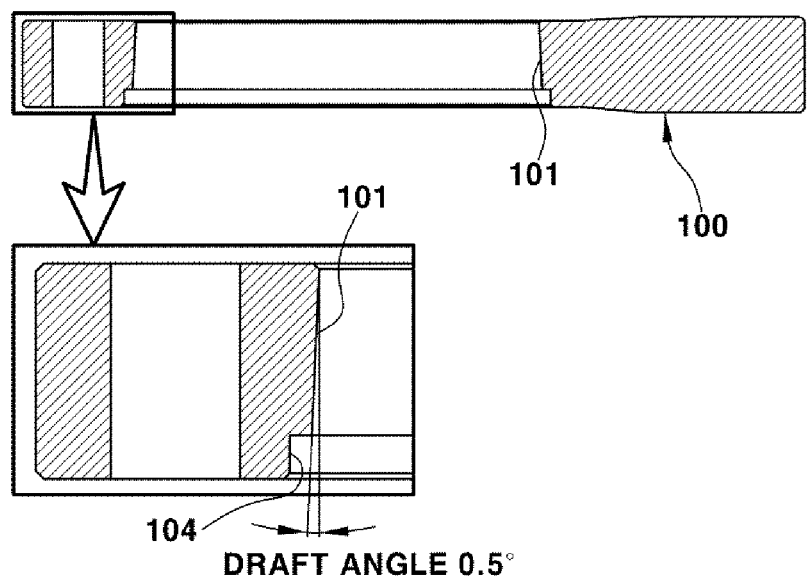
FIG. 5 is a cross-sectional view illustrating the support bracket of the engine mount for a vehicle according to an exemplary embodiment of the present invention.
Figure 6A:
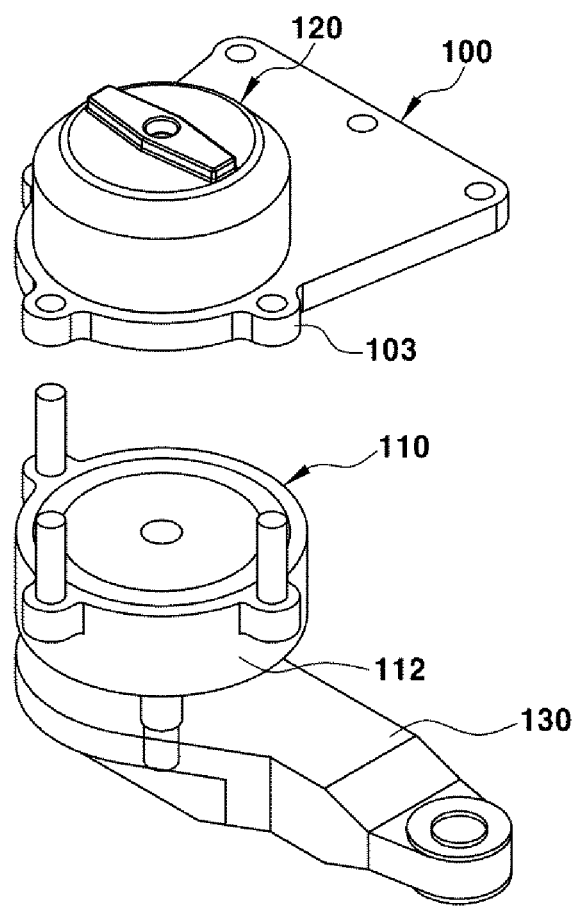
FIG. 6A, FIG. 6B and FIG. 6C are perspective views illustrating a process of assembling the fluid-filled assembly and the support bracket with a rubber assembly in the engine mount for a vehicle according to an exemplary embodiment of the present invention.
Figure 6B:
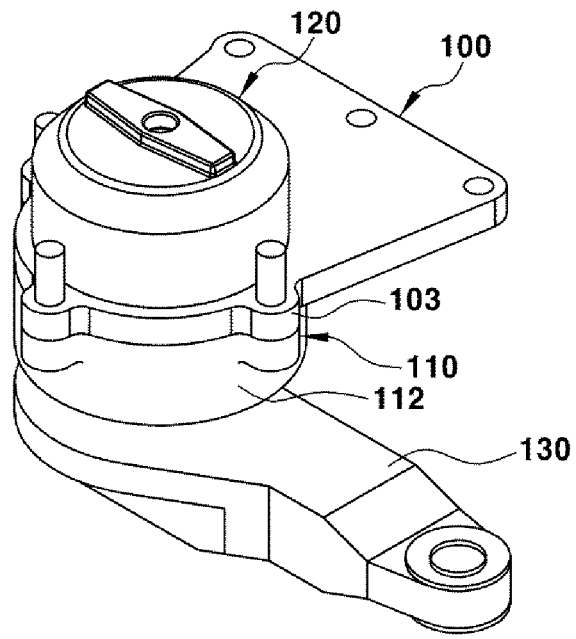
Figure 6C:
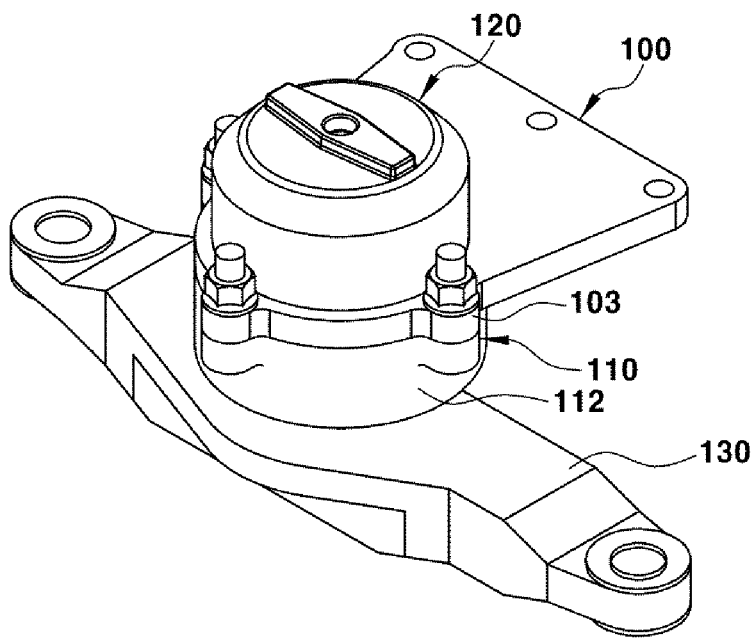

FIG. 3A, FIG. 3B, FIG. 3C, and FIG. 3D and FIG. 4A and FIG. 4B are perspective views and cross-sectional views of essential parts illustrating the process of mounting the support bracket to the fluid-filled assembly in the engine mount for a vehicle according to an exemplary embodiment of the present invention. FIG. 5 is a cross-sectional view illustrating the support bracket of the engine mount for a vehicle according to an exemplary embodiment of the present invention.

Referring to FIG. 3A, FIG. 3B, FIG. 3C, and FIG. 3D, FIG. 4A and FIG. 4B, and FIG. 5, the support bracket 100 includes a mounting hole 101 formed in one end portion thereof, an engine-mounting plate 102 provided at the opposite end portion thereof to be connected to the engine, and a plurality of coupling portions 103 protruding from the external surface of the one end portion thereof to be coupled to the rubber assembly 110.

As is apparently shown in FIG. 5, the mounting hole 101 in the support bracket 100 is formed to have a draft angle (about 0.5 degrees) which is oriented in the downward direction thereof.

Furthermore, the support bracket 100 further includes a locking recess 104, which is formed in the lower end portion of the mounting hole 101 along the internal circumferential surface of the mounting hole 101 to expand in the radially outward direction and to have a uniform cross-section in the entire region thereof.

The fluid-filled assembly 120 assembled as described above is inserted into the mounting hole 101 in the support bracket 100.

In more detail, as shown in FIG. 3A, FIG. 3B, FIG. 3C, and FIG. 3D and FIG. 4A and FIG. 4B, the fluid-filled assembly 120 is inserted into the mounting hole 101 in the support bracket 100 through the lower entrance of the mounting hole 101 in the upward direction thereof. The present insertion process is continuously performed until the external hooks 123 formed at the lower end portion of the hook cup 121 are inserted into and locked by the locking recess 104 formed in the lower end portion of the mounting hole 101 in the support bracket 100 along the internal circumferential surface of the mounting hole 101, realizing assembly of the fluid-filled assembly 120 and the support bracket 100.

The fluid-filled assembly 120 and the support bracket 100, assembled as described above, are assembled with the rubber assembly 110.

FIG. 6A, FIG. 6B and FIG. 6C and FIG. 7A and FIG. 7B are, respectively, a perspective view and a cross-sectional view illustrating the process of assembling the fluid-filled assembly and the support bracket with the rubber assembly in the engine mount for a vehicle according to an exemplary embodiment of the present invention.

The rubber assembly 110 includes a housing 112 having an open top portion, a first core 114, which is formed of a metal material and includes a core bolt 113 disposed inside the housing 112, and a first main rubber 115, which is formed through a curing process to be attached to the first core 114 while surrounding the same and to be attached to the bottom surface of the housing 112.

The first core 114 is located inside the first main rubber 115, and functions as a frame for supporting the first main rubber 115. The core bolt 113 is disposed integrally inside the first core 114 during the process of manufacturing the first core 114.

Figure 7A:
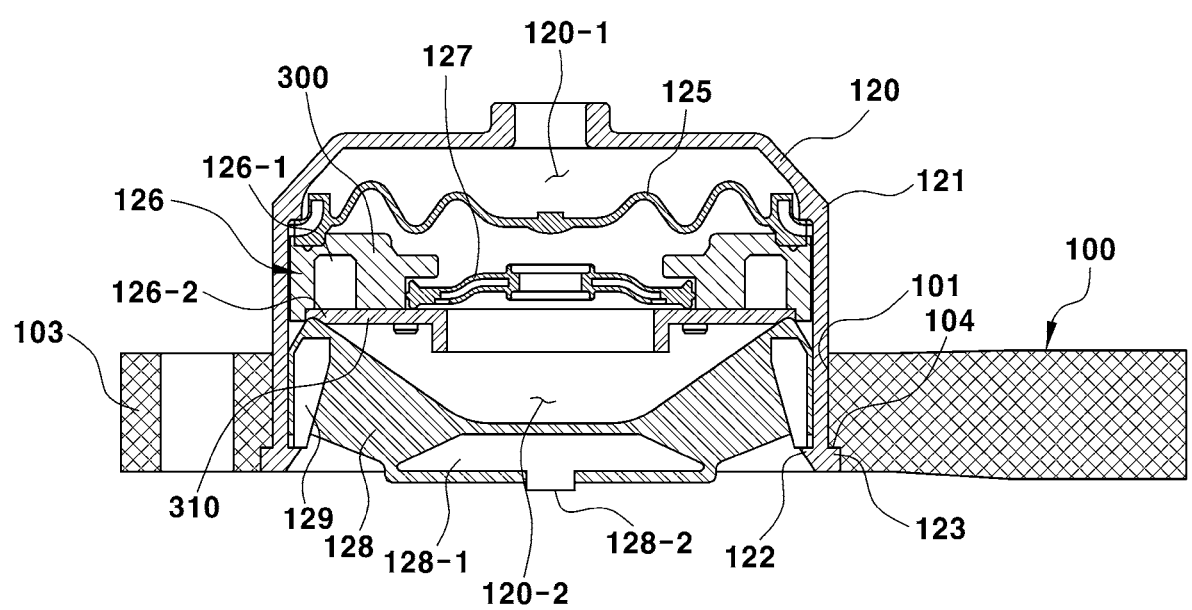
FIG. 7A and FIG. 7B are cross-sectional views illustrating the process of assembling the fluid-filled assembly and the support bracket with the rubber assembly in the engine mount for a vehicle according to an exemplary embodiment of the present invention.
Figure 7B:
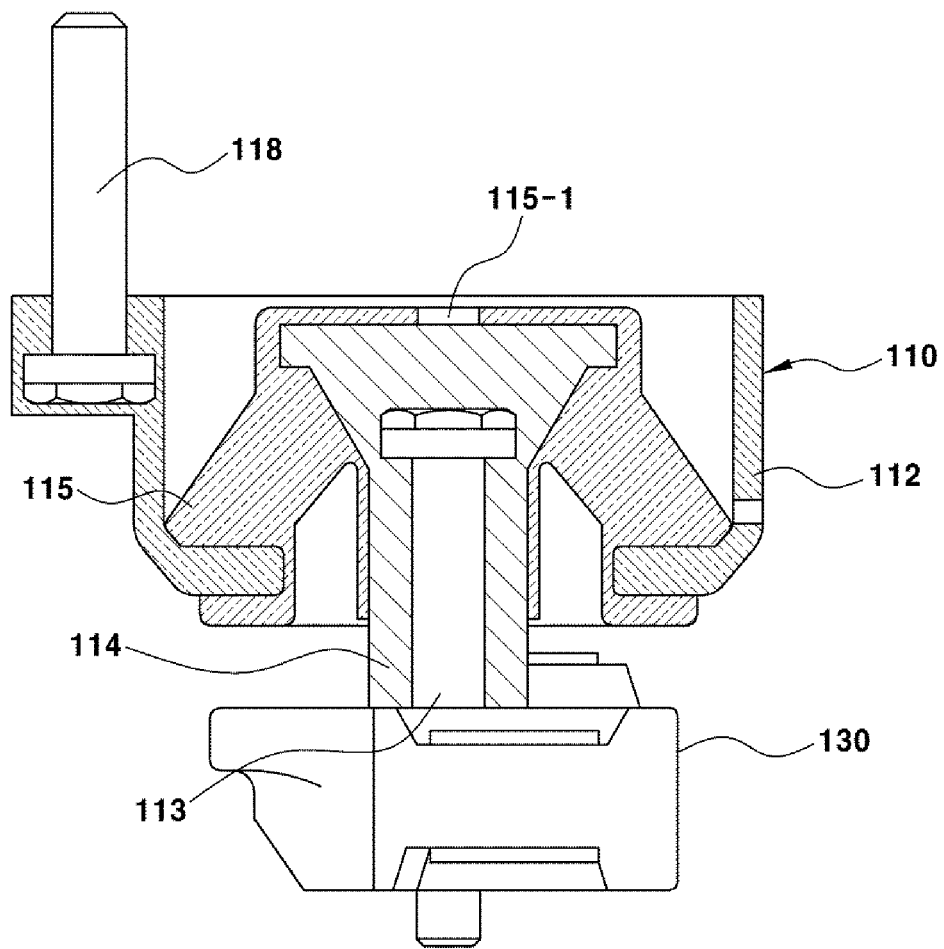

The core bolt 113 protrudes to the outside through a hole formed in the bottom surface of the housing 112. As shown in FIG. 7A and FIG. 7B, the core bolt 113, which protrudes from the bottom surface of the housing 112, is fastened to a vehicle body mounting bracket 130, which is coupled to the vehicle body.

The first main rubber 115, which is formed through a curing process to be attached to the first core 114 while surrounding the same and to be attached to the bottom surface of the housing 112, controls vibration, i.e. absorbs and removes vibration, which is generated in the X, Y and Z directions as the engine operates or the vehicle travels.

Furthermore, the housing 112 includes a plurality of coupling rods 118, which integrally protrude from the external circumferential surface of the housing 112 to be coupled with the coupling portions 103 of the support bracket 100 by bolts 132.

The fluid-filled assembly 120 and the support bracket 100, assembled as described above, are assembled with the rubber assembly 110 configured in the present manner.

As shown in FIG. 6A, FIG. 6B and FIG. 6C and FIG. 7A and FIG. 7B, the fluid-filled assembly 120 is inserted into the mounting hole 101 in the support bracket 100, and is then stacked on the top surface of the rubber assembly 110. At the instant time, each of the coupling rods 118 formed at the housing 112 of the rubber assembly 110 is aligned with and inserted into a respective one of the coupling portions 103 of the support bracket 100. Finally, the coupling rods 118 and the coupling portions 103 are securely coupled to each other by fastening the bolts 132 to the coupling rods 118, with the result that the fluid-filled assembly 120 and the support bracket 100 are completely assembled with the rubber assembly 110.

Figure 8:
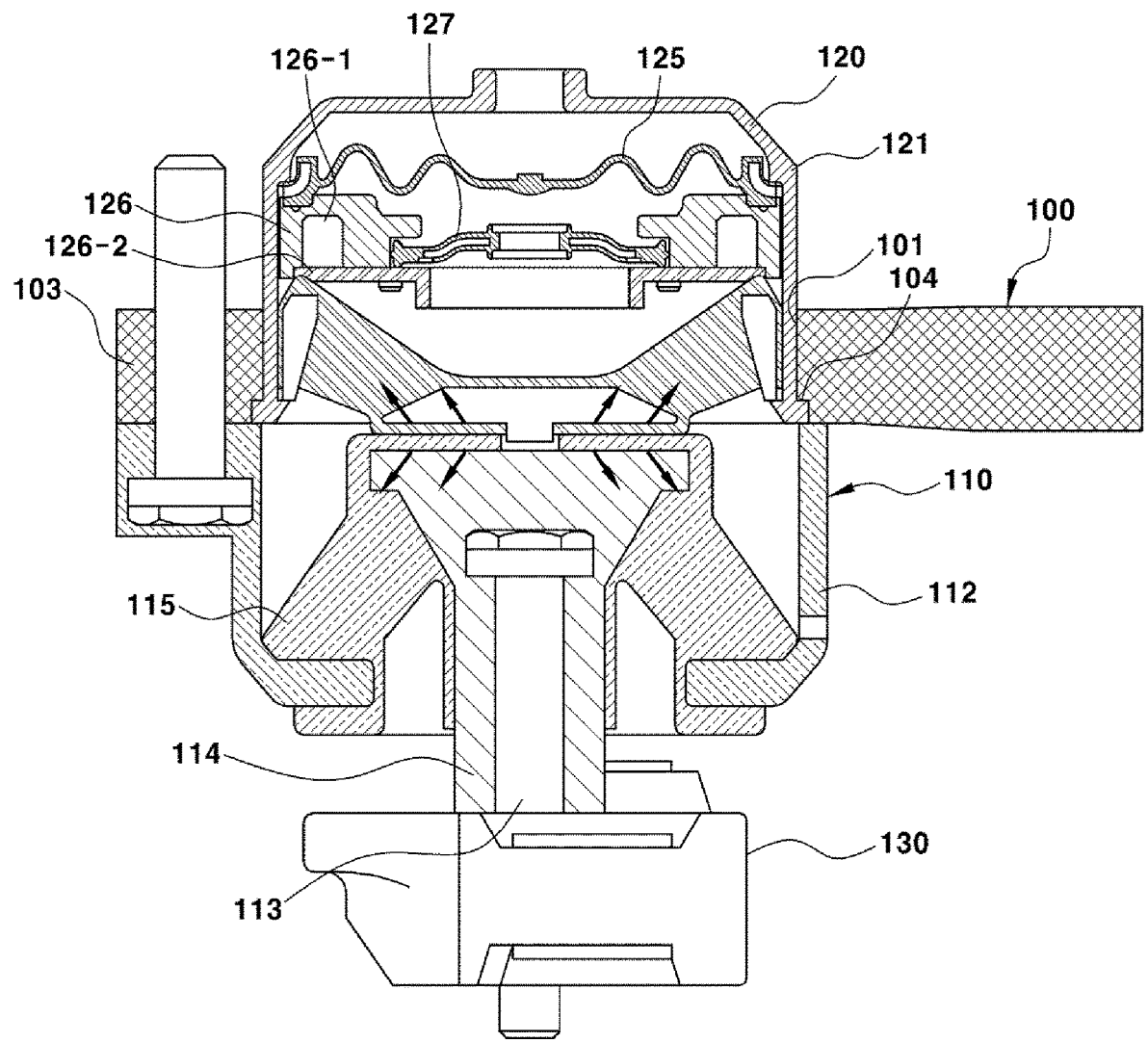
FIG. 8 and FIG. 9 are cross-sectional views illustrating the assembly and operation of the engine mount for a vehicle according to an exemplary embodiment of the present invention.
Figure 9:
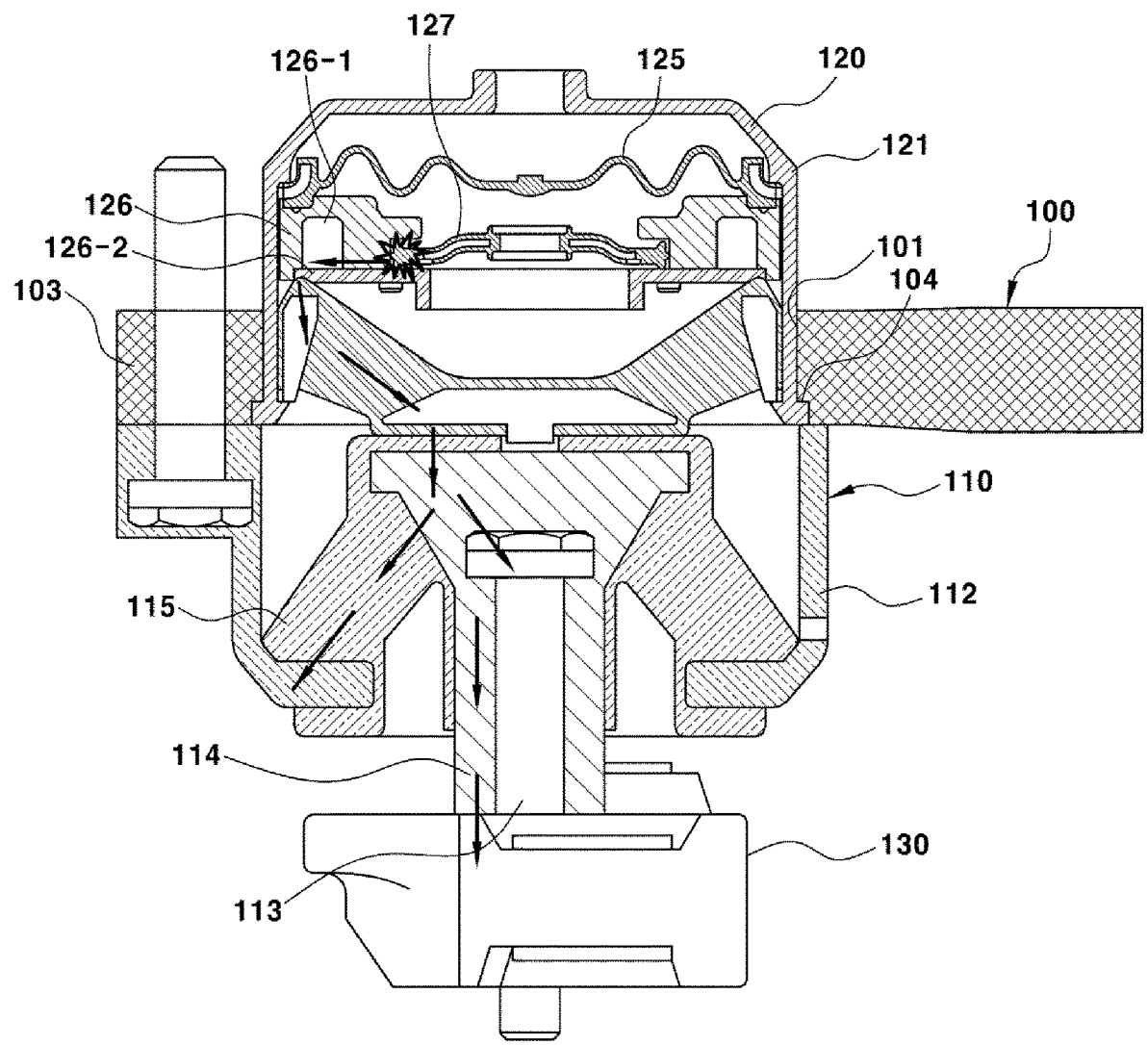

Referring to FIGS. 7 to 9, when the second main rubber 128 of the fluid-filled assembly 120 is formed through a curing process, an auxiliary core 128-1 is provided therein. The auxiliary core 128-1 includes a center-aligning protrusion 128-2 protruding from the center of the bottom surface thereof. The first main rubber 115 of the rubber assembly 110 includes a center-aligning recess 115-1 formed in the center of the top surface thereof, into which the center-aligning protrusion 128-2 is inserted.

At the instant time, when the fluid-filled assembly 120 is stacked on the top surface of the rubber assembly 110, the second main rubber 128 needs to come into close contact with the top surface of the first main rubber 115 while accurately maintaining the position thereof so that force may be transmitted from the first main rubber 115 to the second main rubber 128.

By insertion of the center-aligning protrusion 128-2 into the center-aligning recess 115-1, the second main rubber 128 may be stacked on and come into close contact with the first main rubber 115 while accurately maintaining the position thereof.

Figure 10A:
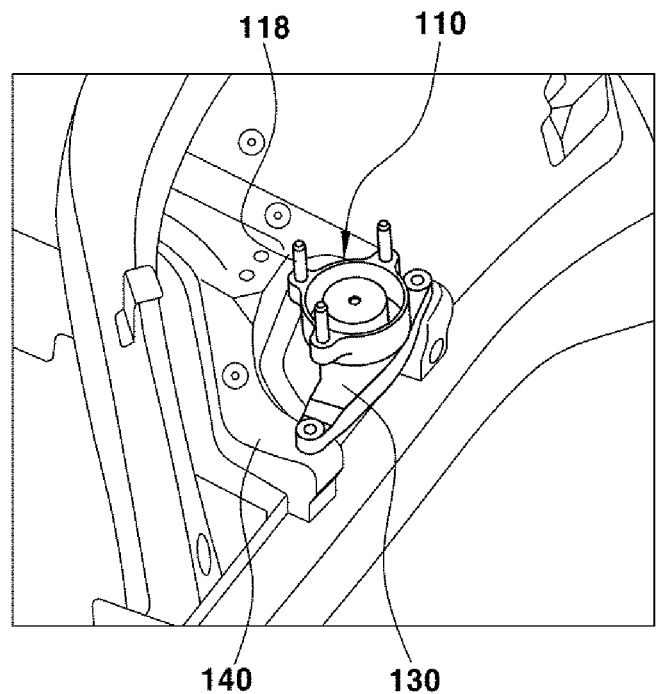
FIG. 10A, FIG. 10B, and FIG. 10C are views schematically illustrating a process of assembling the engine mount for a vehicle according to an exemplary embodiment of the present invention with an engine and a vehicle body.
Figure 10B:
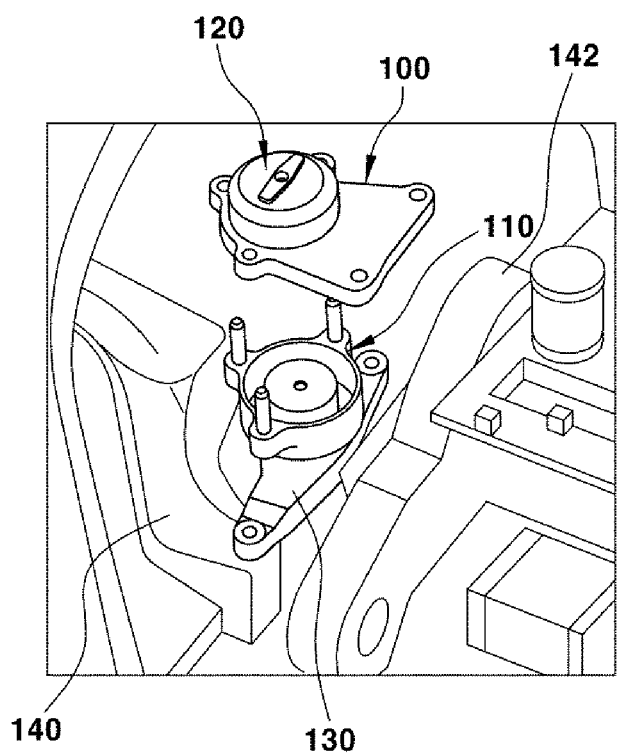
Figure 10C:
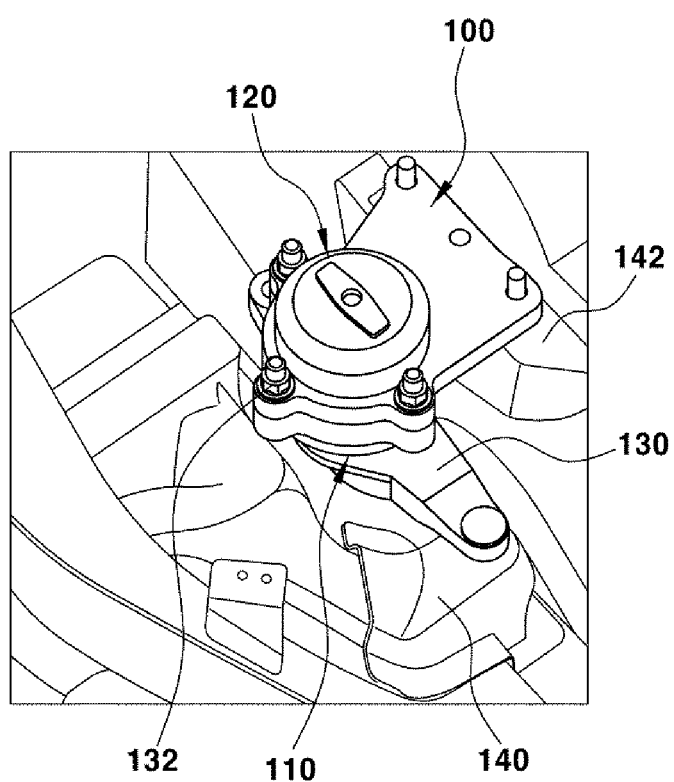

Referring to FIG. 10A, FIG. 10B, and FIG. 10C, the vehicle body mounting bracket 130, to which the core bolt 113 of the rubber assembly 110 has been fastened, is assembled with a vehicle body 140 (a side member). Subsequently, the fluid-filled assembly 120 and the support bracket 100 are stacked on and assembled with the rubber assembly 110 in the above-described manner. Subsequently, the engine-mounting plate 102 of the support bracket 100 is bolted to an engine 142, with the result that the process of assembling the engine mount according to an exemplary embodiment of the present invention is completed.

Therefore, the first main rubber 115 of the rubber assembly 110 controls vibration, i.e. absorbs and removes vibration, which is generated in the X, Y and Z directions as the engine operates or the vehicle travels.

Furthermore, the second main rubber 128 of the fluid-filled assembly 120 controls vibration, i.e. absorbs and removes vibration, which is generated in the Z direction as the engine operates or the vehicle travels. As the second main rubber 128 is deformed in the vertical direction thereof, the fluid in the upper fluid chamber 120-1 moves to the lower fluid chamber 120-2 via the fluid flow passage in the orifice member 126, or the fluid in the lower fluid chamber 120-2 moves to the upper fluid chamber 120-1 via the fluid flow passage in the orifice member 126. Together with the present movement of fluid, the second main rubber 128 absorbs and removes vibration generated in the Z direction thereof.

Furthermore, since the first main rubber 115 and the second main rubber 128 are in contact with each other, as shown in FIG. 7A and FIG. 7B, when vibration is generated as the vehicle travels, force is easily transmitted in the vertical direction (the Z direction) from the first main rubber 115 to the second main rubber 128 and vice versa, easily absorbing and removing vibration generated in the Z direction thereof.

Meanwhile, due to fluid flow pressure or vehicle vibration, the membrane 127 of the fluid-filled assembly 120 may shake, and thus buzz, squeak and rattle (BSR) noises may occur.

However, as shown in FIG. 8, the BSR noises generated by the membrane 127 are primarily and directly isolated by the second main rubber 128. Furthermore, the BSR noises are secondarily and indirectly isolated by the first main rubber 115 when passing through the first core 114. In the present manner, the BSR noises generated by the membrane may be easily isolated and removed.

As is apparent from the above description, the present invention having the above-described configuration provides the following effects.

First, the support bracket, which is to be connected to an engine, is directly and integrally coupled to the hook cup of the fluid-filled assembly during the process of assembling the engine mount, with the result that the connection structure between the engine mount and the engine is simplified and assembly efficiency is improved compared to the related art.

Second, since the fluid-filled assembly may be easily separated from the rubber assembly, it is easy to tune the engine mount or to perform maintenance thereof. Furthermore, it is possible to tune the engine mount by replacing only a failed portion without needing replace the entire engine mount. Therefore, the costs required for tuning the engine mount or for maintenance may be reduced.

Third, it is possible to obtain new vibration control characteristics or optimum vibration control characteristics by physically assembling a fluid-filled assembly having various configurations with the rubber assembly. Furthermore, the rubber assembly controls vibration generated in X, Y and Z directions, and the fluid-filled assembly additionally controls vibration generated in the Z direction thereof. Therefore, the present invention is effective for controlling engine vibration.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine mount for a vehicle, the engine mount comprising:
    a support bracket including:
        a mounting hole formed in an end portion of the support bracket;
        an engine-mounting plate provided at an opposite end portion of the support bracket to be connected to an engine; and
        a coupling portion protruding from an external surface of the engine-mounting plate;
    a fluid-filled assembly including a hook cup inserted into the mounting hole of the support bracket; and
    a rubber assembly mounted to a vehicle body,
    wherein, in a state in which the fluid-filled assembly is inserted into the mounting hole in the support bracket, the fluid-filled assembly is stacked on a top surface of the rubber assembly, and a housing of the rubber assembly is coupled to the coupling portion of the support bracket,
    wherein the support bracket includes a locking recess formed in a lower end portion of the mounting hole along an internal circumferential surface of the mounting hole, and
    wherein the hook cup includes a plurality of external hooks integrally formed at a lower end portion of the hook cup to be fitted into the locking recess.

2. The engine mount of claim 1, wherein the mounting hole is formed to have a draft angle which is oriented in a downward direction thereof.

3. The engine mount of claim 1, wherein the rubber assembly includes:
    the housing having an open top portion, wherein the housing is connected to the vehicle body;
    a first core including a core bolt; and
    a first main rubber formed at a bottom surface of the housing through a curing process to surround the first core.

4. The engine mount of claim 3, wherein the core bolt protrudes from a bottom surface of the housing and is fastened to a vehicle body mounting bracket.

5. The engine mount of claim 3, wherein the housing includes a coupling rod integrally formed at an external circumferential surface of the housing to be coupled with the coupling portion of the support bracket using a fastener.

6. The engine mount of claim 1,
    wherein the hook cup is stacked on an open top portion of the housing of the rubber assembly, and
    wherein the fluid-filled assembly further includes:
        a diaphragm disposed at an upper end portion of the hook cup and positioned inside the hook cup to maintain sealing contact with the hook cup;
        an orifice member disposed under the diaphragm inside the hook cup, the orifice member including a fluid flow passage formed in the orifice member;
        a second main rubber disposed under the orifice member; and
        a membrane disposed in a hollow portion formed in a middle of the orifice member to form an upper fluid chamber between the membrane and the diaphragm and a lower fluid chamber between the membrane and the second main rubber, the upper fluid chamber, the fluid flow passage, and the lower fluid chamber being fluidically communicating with each other,
    wherein the second main rubber is disposed such that a circumference of a top surface of the second main rubber contacts with and is supported by a circumference of a bottom surface of the orifice member, such that an external circumferential surface of the second main rubber maintains sealing contact with an internal circumferential surface of the hook cup with respect to downward flow of a fluid, and such that a bottom surface of the second main rubber contacts with a top surface of a first main rubber of the rubber assembly.

7. The engine mount of claim 6, wherein the first main rubber is formed at a bottom surface of the housing through a curing process.

8. The engine mount of claim 6, wherein the hook cup includes a plurality of internal hooks integrally formed at an internal surface of a lower end portion of the hook cup, the internal hooks being configured to allow a circumference of a bottom surface of the second main rubber to be locked by the internal hooks.

9. The engine mount of claim 8, wherein the fluid-filled assembly further includes a second core provided inside the second main rubber along a circumference of the second main rubber, the second core including a lower end portion exposed through a bottom surface of the second main rubber to be locked by the internal hooks.

10. The engine mount of claim 6, wherein the fluid-filled assembly further includes an auxiliary core provided inside the second main rubber, the auxiliary core including a center-aligning protrusion formed at a center of a bottom surface of the auxiliary core to be inserted into a center-aligning recess formed in the first main rubber.

11. The engine mount of claim 8,
wherein the hook cup includes a plurality of support legs integrally formed at a lower end portion of the hook cup, and
wherein each of a plurality of external hooks integrally formed at a lower end portion of the hook cup to be fitted into the locking recess and each of the internal hooks share a corresponding one of the support legs to integrally protrude outwards from an external surface of the corresponding one of the support legs and inwards from an internal surface of the corresponding one of the support legs, respectively.

\* \* \* \* \*